United States Patent
Grosseau

[15] 3,672,101
[45] June 27, 1972

[54] LAPPING OR MICRO-MACHINING TOOLS

[72] Inventor: Albert Grosseau, Chaville, France
[73] Assignee: Societe Anonyme Automobiles Citroen, Paris, France
[22] Filed: May 25, 1970
[21] Appl. No.: 40,080

[30] Foreign Application Priority Data
May 30, 1969 France..................................6916427

[52] U.S. Cl............................................51/165.93, 51/34 H
[51] Int. Cl.........................................................B24b 49/00
[58] Field of Search......................51/34, 165, 165.9, 165.92, 51/165.93

[56] References Cited

UNITED STATES PATENTS

| | | | |
|---|---|---|---|
| 3,451,175 | 6/1969 | Sunnen | 51/34 X |
| 3,369,327 | 2/1968 | Estabrook | 51/34 J |
| 3,404,490 | 10/1968 | Estabrook | 51/165.93 |
| 2,779,140 | 1/1957 | Saives | 51/34 C |
| 3,030,740 | 4/1962 | Greening | 51/34 R |

Primary Examiner—Harold D. Whitehead
Attorney—Arnold Robinson

[57] ABSTRACT

Improvement in a machine for lapping or micro-machining whereby the direction of longitudinal movement of the tool is reversed when a rapid drop in torque resistance between the tool and the work piece occurs. The machine comprises a longitudinally reciprocated mounting which carries a rotary spindle attached to a machining tool through a torque detector.

6 Claims, 3 Drawing Figures

LAPPING OR MICRO-MACHINING TOOLS

BACKGROUND OF THE INVENTION

1. Field of the Invention

The present invention relates to machine tools, and more particularly, but not exclusively to machine tools which use either expanding or non-expanding tools for lapping or micro-machining processes.

Such machine tools incorporate a mounting carrying a tool driving spindle with means for longitudinally reciprocating the mounting.

2. Description of the Prior Art

In machine tools of this type proposed hitherto, a device interposed between the tool and its driving spindle serves to detect the torque resistance encountered by the tool. The movement of the tool or of its expander is governed by the torque detected, so as to keep the working torque constant.

The torque resistance falls rapidly at the end of the tool travel; when the length of the working portion of the tool diminishes; or, in the case of a bore that is conical, when the tool leaves the small diameter of the bore; or, in the case of a conical or barrel-shaped tool, when the large-diameter part of the tool leaves the workpiece. In all these cases, the direction of movement of the spindle mounting needs to be reversed, if the tool is to stay within the useful working zone.

The object of the present invention is to provide a micro-machining or lapping machine in which automatic reversal of the direction of the reciprocating movements imparted to the mounting occurs whenever the tool leaves its useful working zone.

SUMMARY OF THE INVENTION

According to the invention, there is provided in a machine tool, having a spindle mounting, a spindle carried by said mounting and means for longitudinally reciprocating said mounting, the improvement comprising a torque resistance detector arranged to be interposed between said spindle and a tool carried by said spindle, and reversing means operatively connected between said detector and said reciprocating means to reverse the direction of movement of said mounting whenever a predetermined fall in torque resistance occurs within a predetermined period of time.

Further according to the invention, there is provided a machine tool comprising a spindle mounting, a spindle carried by said mounting, means for reciprocating said mounting axially with respect to said spindle, a torque resistance detector arranged to be interposed between said spindle and a tool carried by said spindle, reversing means operatively connected between said detector and said reciprocating means to reverse the direction of movement of said mounting whenever a predetermined fall in torque resistance occurs within a predetermined time, said reversing means comprising pressure sensitive means actuated in response to a fall in torque resistance detected by said detector, a first bi-stable flip-flop operatively connected to said reciprocating means to control the direction of movement of said mounting, and a second bi-stable flip-flop operatively connected to said first flip-flop and to said pressure sensitive means whereby actuation of said pressure sensitive means causes said second flip-flop to trip said first flip-flop and reverse the direction of movement of said mounting.

BRIEF DESCRIPTION OF THE DRAWINGS

Embodiments of the invention will now be described by way of example only with reference to the accompanying diagrammatic drawing, in which.

DESCRIPTION OF THE PREFERRED EMBODIMENTS

Figure 1:
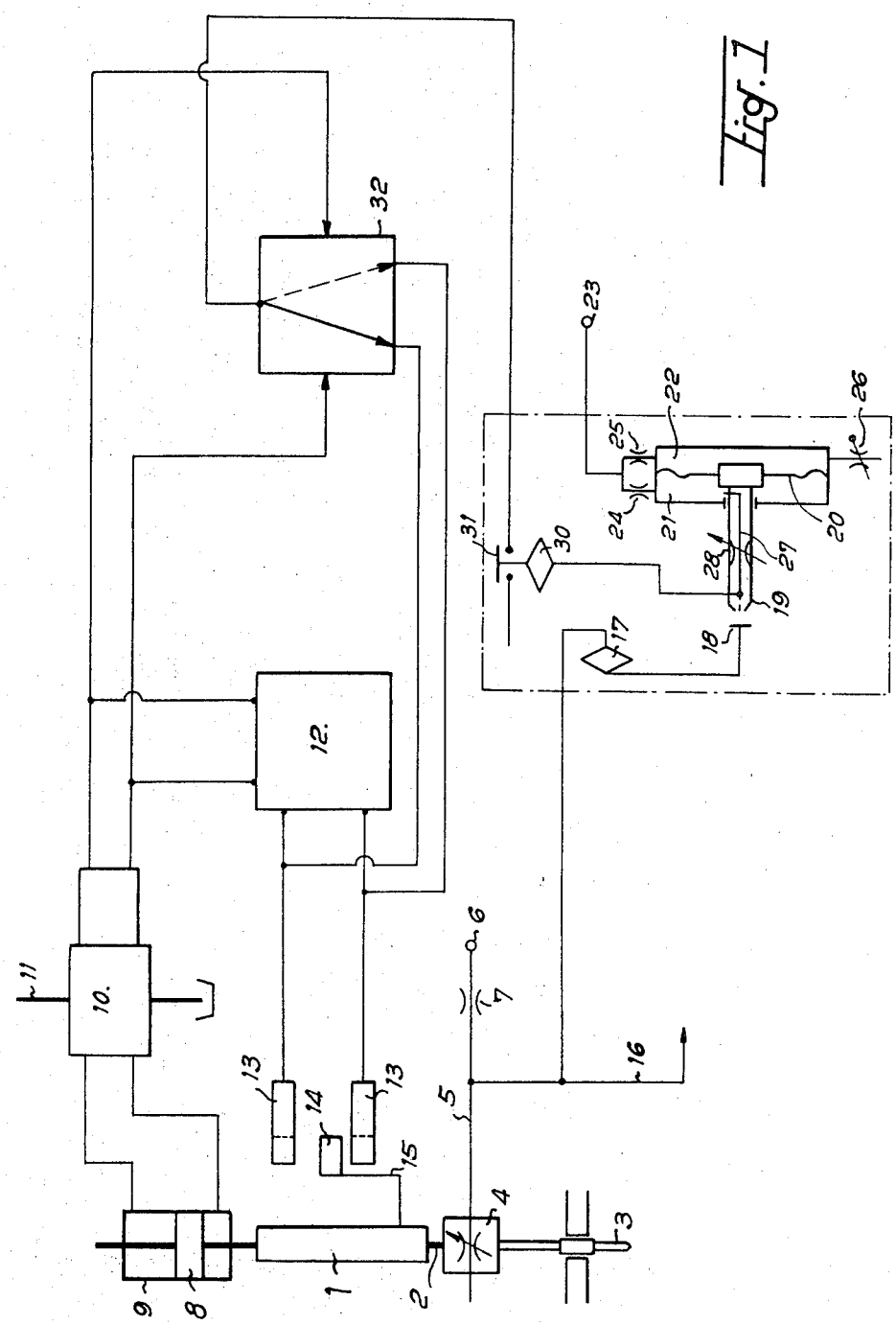
FIG. 1 shows schematically the layout of a first embodiment of the invention.

In the embodiment shown in FIG. 1, there is provided a mounting 1, which slides longitudinally in a support (not shown), and carries a rotary spindle 2 attached to a machining tool 3 through a torque detector 4. The detector 4 can be, for example, of the type described in French Pat. No. 1,538,652, in which means are incorporated whereby the cross-section of the delivery portion of a pipe 5, connected to a compressed-air source 6 through a flow limiter 7, can be varied according to the torque resistance. The pressure in the pipe 5 is governed by the cross-section of its delivery portion and hence by the torque resistance. It will be assumed, in the following, that the cross-section of the delivery portion is enlarged as the torque resistance increases, whereby the pressure in the pipe 5 varies inversely with the torque resistance.

The mounting 1 is rigidly attached to the piston 8 of a double-acting hydraulic ram 9, which is connected by a servo-distributor 10 to a pressure-fluid source 11.

The servo-distributor 10 is controlled by a bi-stable electronic flip-flop 12 which in turn is controlled by two electrostatic contacts. Each of these contacts is of conventional type, with a first fixed capacitor element 13, and a second capacitor element 14 which is adjustably mounted on a rod 15 rigidly attached to the mounting 1. When the element 14 enters either of the elements 13, the resultant variation in capacity trips the flip-flop 12, the result of which is to reverse the direction of flow of the liquid in the servo-distributor 10 and hence also the direction in which the piston 8 moves in the cylinder of the ram 9.

Thus, if, for example, the piston 8 moves downwardly (as viewed in FIG. 1), the capacitor element 14 will pass into the lower capacitor element 13 when the mounting 1 reaches the end of its travel, so that the flip-flop 12 will be tripped to reverse the direction of flow of the liquid in the servo-distributor 10. Thus the piston 8, together with the mounting 1 will be moved upwardly. As soon as the mounting 1 reaches its uppermost position, the flip-flop 12 will be tripped to cause movement of the piston 8 downwardly. Reciprocation is thus imparted to the mounting 1 axially in relation to the tool 3. Means are also provided — these are not shown, but will be familiar to those skilled in the art — for rotating the tool 3 and for expanding it if it is of the expanding type; in the latter event, the device by which expansion is brought about is connected by a pipe 16 to the pipe 5. The means referred to may be, for example, of the type described in the aforementioned French patent or in British patent applications Nos. 14,618/69 and 14,617/69.

The pipe 5 is connected to the stationary face of a pressure capsule, 17, the moving face of which carries a flat plate 18.

The plate 18 faces the discharge orifice of a nozzle 19 which has freedom of axial movement and is attached to a diaphragm 20. The diaphragm 20 forms a partition between two chambers 21 and 22, which are connected to a compressed-air supply 23, through flow regulators 24 and 25 respectively. The chamber 22 is open to the atmosphere by way of a flow regulator 26 set to a value below the adjustment level of the regulator 25. The chamber 21 communicates with the discharge orifice of the nozzle 19 through a tube 27 in which is interposed a flow regulator 28.

The tube 27 is, in turn, connected by a pipe 29 to the stationary face of a pressure capsule 30 the moving face of which carries a contact 31. The contact 31 is inserted in the control circuit of a repeating electronic flip-flop 32 which is so linked to the flip-flop 12 as to be normally in the same state as the flip-flop 12. The outputs of the flip-flop 32 are connected to the flip-flop 12 in parallel with the capacitor elements 13 so as to send, to the flip-flop 12 when the contact 31 closes, a priority signal that causes it to trip.

When there is a pressure rise in the pipe 5, consequent upon a reduction in the torque resistance, the capsule 17 expands so that the plate 18 is moved away from the discharge orifice of the nozzle 19. The pressure within the chamber 21 is thereby reduced so that the diaphragm 20 moves, along with the nozzle 19, in a direction towards the plate 18.

If the pressure change in the pipe 5 is slow, the nozzle 19 follows the movement of plate 18, so that the pressure within the tube 29 will remain substantially constant.

On the other hand, if the pressure in the pipes rises sharply, that is to say if it takes place in conjunction with a given reduction in the torque resistance or within less than a given period of time, such as for example, a reduction of one-fiftieth in the nominal torque or a time shorter than 16 milli-seconds, the plate 18 will be moved rapidly away from the nozzle 19. The pressure in the chamber 21 will be unable, because of the flow regulator 28, to fall fast enough for advance of the nozzle 19 to keep up with the movement of the plate 18. Thus the pressure in the tube 29 and capsule 30 will drop, causing the contact 31 to close. The flip-flop 32 will thereupon trip and send a priority signal to the flip-flop 12, causing it to trip. There will be a change-over in the servo-distributor 10, thereby reversing the direction of movement of the mounting 1.

In the reverse case, that is to say when the torque resistance increases, the distance between the plate 18 and the nozzle 19 diminishes and the pressure rises within the chamber 21, causing the nozzle 19 to be withdrawn until the distance between the nozzle 19 and the plate 18 has been restored to its initial value. This movement, however, whether slow or fast, will not cause actuation of the contact 31.

It will be observed that when to tool 3 reaches the end of its travel the torque resistance falls rapidly, whereupon the flip-flop 32 causes the direction of movement of the mounting 1 to be reversed. It is preferable, however, to retain the capacitors 13 and 14 as a precaution, so as to keep the tool 3 within its useful working zone and to limit the tool movement in one direction when there is a risk of collision.

Figure 2:
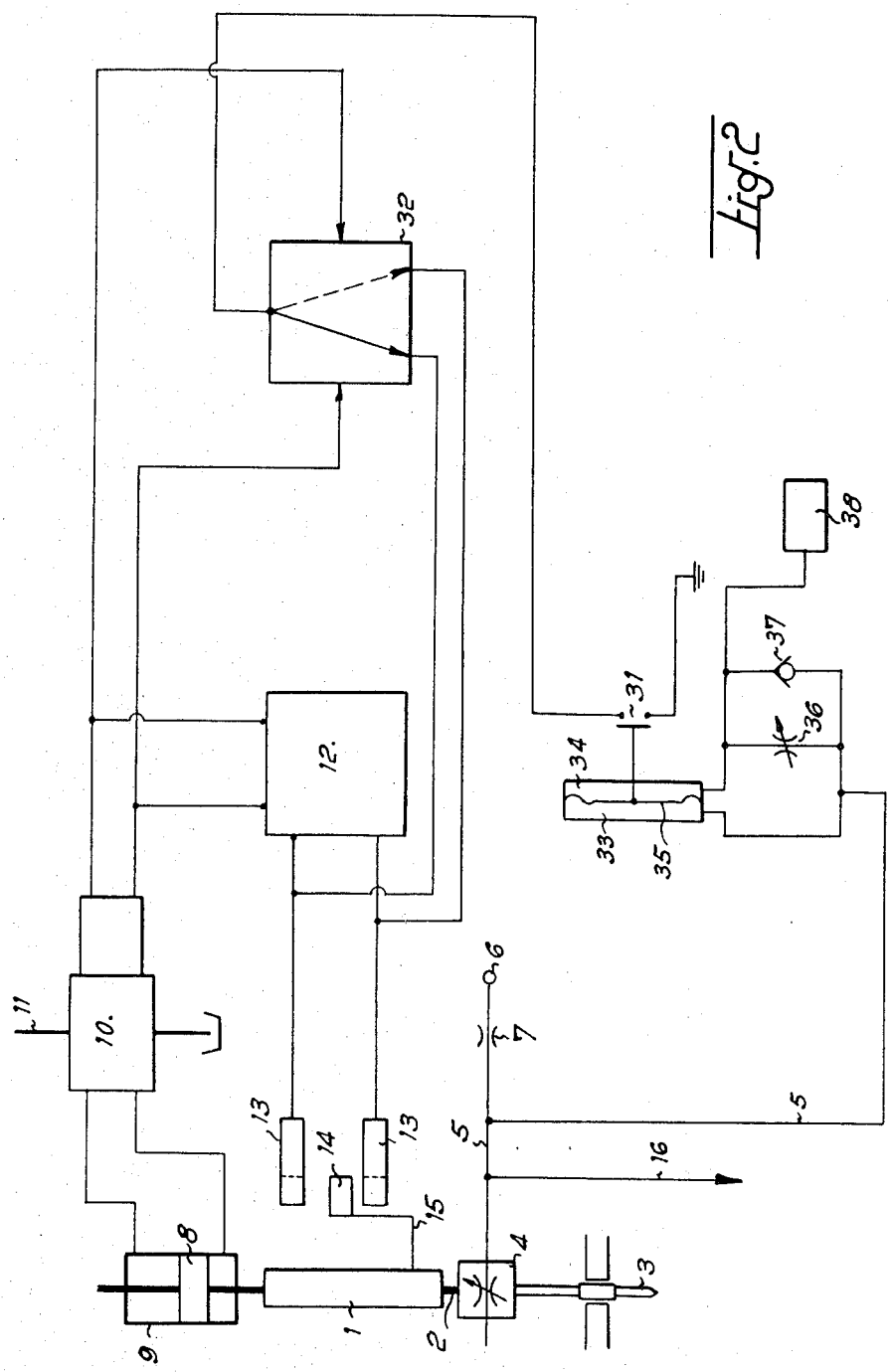
FIG. 2 shows schematically the layout of a second embodiment.

In the embodiment shown in FIG. 2, the assembly formed by the capsules 17 and 30, nozzle 19 and the arrangement for moving the latter has been replaced by a simple differential contactor. The contactor has two chambers 33 and 34, separated by a diaphragm 35 which carries the contact 31. The pipe 5 is connected directly to the chamber 33, and is connected to the chamber 34 through a flow regulator 36 in parallel with which is a non-return valve 37, by which air is prevented from passing from the pipe 5 to the chamber 34. The chamber 34 is also preferably connected to a closed vessel 38 the effect of which is to damp the high-frequency oscillations impressed on the pneumatic signal, the amplitude of which oscillations may attain values such as to cause untimely and erroneous operation of the reversing device.

When pressure rises slowly in the pipe 5, the pressures within the chambers 33 and 34 rise at the same time and the contact 31 remains motionless. Should this pressure rise be rapid, however, the flow regulator 36 prevents the air from passing into the chamber 34 rapidly enough to offset the pressure rise in the chamber 33, with the result that the diaphragm 35 is moved, together with the contact 31, which is thus closed.

When pressure falls in the pipe 5, the valve 37 opens and the pressures within the chambers 33 and 34 are reduced simultaneously.

Figure 3:
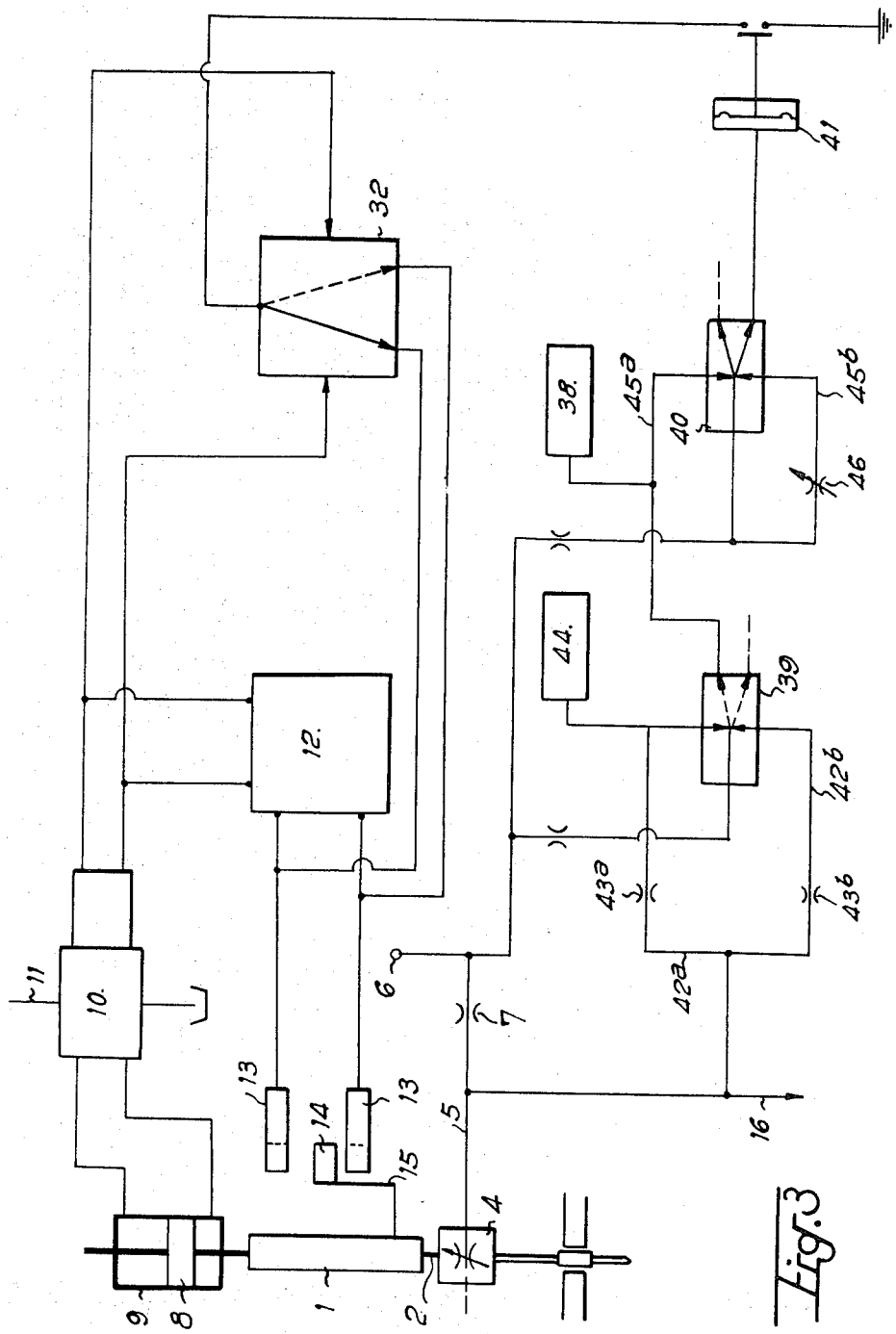
FIG. 3 shows schematically the layout of a third embodiment.

In the embodiment shown in FIG. 3, the pneumatic signal is amplified by a proportional fluid amplifier 39 which acts on a bi-stable pneumatic trip 40 which controls a pressure contactor 41 inserted in the control circuit of the repeating flip-flop 32.

The pilot circuits 42a and 42b of the amplifier 39 are connected to the pipe 5 through pressure reducing valves 43a and 43b; in addition, the circuit 42a is connected to a closed retarding vessel 44.

The pilot circuits 45a and 45b of the bi-stable trip 40 are connected respectively to the output of the amplifier 39 and to the compressed-air supply 6 through a pressure regulator 46. A closed vessel 38 for damping out the high-frequency oscillations impressed on the first signal, is connected to the circuit 45a.

In operation, pressure variation within the pipe 5 is amplified by the amplifier 39 and acts on the trip 40. The amplification factor may be of the order of 10, but if that is inadequate several amplifiers may be connected in series.

When pressure rises in the pipe 5 and hence in the circuit 45a, the trip 40 changes over momentarily and acts on the pressure contactor 41. The contactor 41 is returned to its original position as soon as the control signal ceases, by virtue of the second piloting of the trip by the circuit 45b.

What is claimed is:

1. In a machine tool having
   a spindle mounting,
   a spindle carried by said mounting, and
   means for longitudinally reciprocating said mounting, the improvement comprising,
   a torque resistance detector interposed between said spindle and a tool carried by said spindle, and
   reversing means operatively connected between said detector and said reciprocating means to reverse the direction of movement of said mounting in response to a predetermined fall in torque resistance occuring within a predetermined period of time.

2. A machine tool as claimed in claim 1 wherein, said reversing means comprises
   a gas-flow pipe having a variable cross-section portion and
   means responsive to pressure changes in said gas-flow pipe, said detector being operable to vary the cross-section of the said portion of the said gas-flow pipe.

3. A machine tool as claimed in claim 2 wherein said pressure-responsive means comprises
   a differential pressure contactor, said contactor having, first and second chambers,
   means providing a direct communication between said first chamber and said gas-flow pipe,
   a non-return valve
   a flow regulator in parallel with said non-return valve and
   means including said non-return valve and said flow regulator providing a communication between said second chamber and said gas-flow pipe.

4. A machine tool as claimed in claim 2 wherein said pressure-responsive means comprises
   a gas-flow nozzle having a discharge outlet and movable in response to the pressure of gas therein,
   a member movably mounted adjacent said discharge outlet,
   means responsive to the pressure within said gas-flow pipe to move said member relatively to said discharge outlet,
   means linking movement of said nozzle, and
   a pressure-sensitive contactor actuable in response to a predetermined pressure change within said nozzle.

5. A machine tool as claimed in claim 2 wherein said pressure responsive means comprises
   fluid amplifier means responsive to the pressure within said gas-flow pipe,
   a bi-stable pneumatic trip operatively connected to said fluid amplifier means, and
   a pressure responsive contactor controlled by said pneumatic trip.

6. A machine tool comprising
   a spindle mounting,
   a spindle carried by said mounting
   means for longitudinally reciprocating said mounting,
   a torque resistance detector interposed between said spindle and a tool carried by said spindle, and
   reversing means operatively connected between said detector and said reciprocating means to reverse the direction of movement of said mounting in response to a predetermined fall in torque resistance occuring within a predetermined time, said reversing means comprising
   pressure sensitive means actuable in response to a fall in torque resistance detected by said detector,
   a first bi-stable flip-flop operatively connected to said reciprocating means to control the direction of movement of said mounting, and a second bi-stable flip-flop operatively connected to said first flip-flop and to said pressure sensitive means whereby actuation of said pressure sensitive means causes said second flip-flop to trip said first flip-flop and reverse the direction of movement of said mounting.

* * * * *